United States Patent
Suzuki et al.

(10) Patent No.: US 7,362,761 B2
(45) Date of Patent: Apr. 22, 2008

(54) PACKET PROCESSING APPARATUS

(75) Inventors: Kazuyuki Suzuki, Kawasaki (JP); Shirou Uriu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 950 days.

(21) Appl. No.: 10/697,522

(22) Filed: Oct. 30, 2003

(65) Prior Publication Data

US 2004/0100977 A1 May 27, 2004

(30) Foreign Application Priority Data

Nov. 1, 2002 (JP) ............................ 2002-319917

(51) Int. Cl.
*H04L 12/56* (2006.01)

(52) U.S. Cl. ........................... 370/394; 370/414

(58) Field of Classification Search ............ None
See application file for complete search history.

(56) References Cited

U.S. PATENT DOCUMENTS

| | | | |
|---|---|---|---|
| 4,825,436 A * | 4/1989 | Kobayashi et al. | 370/505 |
| 5,612,953 A * | 3/1997 | Olnowich | 370/367 |
| 6,553,000 B1 * | 4/2003 | Ganesh et al. | 370/235 |
| 6,788,699 B1 * | 9/2004 | Yoshikawa | 370/417 |
| 6,982,975 B1 * | 1/2006 | Aramaki et al. | 370/388 |
| 6,993,031 B2 * | 1/2006 | Murase | 370/395.32 |
| 7,085,272 B2 | 8/2006 | Sugai et al. | |
| 7,085,274 B1 * | 8/2006 | Rahim et al. | 370/394 |
| 7,088,716 B2 | 8/2006 | Sugai et al. | |
| 2003/0112798 A1 * | 6/2003 | Ziegler et al. | 370/366 |
| 2004/0100977 A1 | 5/2004 | Suzuki et al. | |
| 2006/0233156 A1 | 10/2006 | Sugai et al. | |

FOREIGN PATENT DOCUMENTS

| | | | |
|---|---|---|---|
| EP | 0991231 A1 * | 5/2000 | |
| JP | 2000-101638 | 4/2000 | |
| JP | 2001-211203 | 8/2001 | |

OTHER PUBLICATIONS

Japanese Office Action mailed Nov. 6, 2007, from the corresponding Japanese Application.

* cited by examiner

*Primary Examiner*—Chau Nguyen
*Assistant Examiner*—Sori A Aga
(74) *Attorney, Agent, or Firm*—Katten Muchin Rosenman LLP

(57) ABSTRACT

A packet processing apparatus that realizes improved overall relaying performance by distributing input packets to multiple packet analyzing modules for information processing is disclosed. The packet processing apparatus includes a distributor for assigning a sequence number to each of the input packets and distributing the numbered packets. The packet analyzing modules realize parallel execution of information analyzing processes on the packets distributed from the distributor. An order correction buffer rearranges the packets supplied from the packet analyzing modules in order according to the sequence numbers assigned to the packets and outputs the packets in the rearranged order.

11 Claims, 7 Drawing Sheets

PACKET PROCESSING APPARATUS

BACKGROUND OF THE INVENTION

1. Field of the Invention

The present invention relates generally to a packet processing apparatus, and particularly to a packet processing apparatus for analyzing information such as the destination and sender of a packet.

2. Description of the Related Art

In a packet processing apparatus such as a router apparatus that processes packets conforming to IP (Internet Protocol), for example, a packet analyzing module is implemented and a packet transmission process is performed according to a result of analyzing information such as the destination and sender of the packet.

Generally, a device such as a network processor is used as the packet analyzing module, and a CAM (Content Addressable Memory) device is used for the information analysis of the packet. A CAM, which is an associative memory, realizes a function of inputting data stored in a CAM entry (memory) as a key and providing in return an address of the CAM entry in which the key data is stored.

An IP router, unlike a telephone exchange apparatus, realizes connectionless communications, and is characterized by performing information analysis of an input packet in real time to determine the destination of the packet and whether transmission is possible.

FIG. 1 is a block diagram showing a conventional configuration of an IP router apparatus. As is shown in this drawing, the IP router apparatus includes line terminating units $10_1$~$10_N$ respectively terminating lines connected to the IP router apparatus, packet processing units $12_1$~$12_N$ to which packets received from the respective lines are supplied, and a switch fabric 14. The packet processing units $12_1$~$12_N$ each have a network processor (NP) for analyzing information such as the destination and sender of a packet and supplying the analyzing result together with the packet to the switch fabric 14. The switch fabric 14 switches the packets supplied from the packet processing units $12_1$~$12_N$ according to their respective analyzing results, after which the switched packets are supplied to the respective packet processing units $12_1$~$12_N$ so that information such as the destination and sender of each of the switched packets is analyzed. Then, the packets are sent to their corresponding destination lines via the respective line terminating units $10_1$~$10_N$.

Also, other conventional systems for handling variable-length packets can be found, for example, in Japanese Laid-Open Patent Application No. 2000-101638.

In recent years and continuing, progress is being made in increasing data speed, and with this advancement, the capacity of the router and the data transmission speed are also being increased. As a result, the processing speed of the packet analyzing module (PFE: Packet Forwarding Engine) has to be increased in accordance with the increase of the data transmission speed.

However, the processing capability of a packet analyzing module such as the network processor is limited, and depending on the transmission speed and the packet length, there may be cases in which a process that is to be performed for a packet cannot be completed during its packet transmission time. Further, when the physical speed is increased, the problem with processing speed becomes more apparent and may lead to the degradation of the relaying performance of the packet analyzing module.

SUMMARY OF THE INVENTION

The present invention has been developed in response to the above described problems of the related art and its object is to provide a packet processing apparatus that distributes input packets to a plurality of packet analyzing modules for packet information processing so that the overall relay processing performance of the packet processing apparatus can be improved.

The packet processing apparatus of the present invention includes:

a distributor for assigning a sequence number to each of packets input to the distributor and distributing the packets;

a plurality of packet analyzing units for realizing parallel execution of information analyzing processes on the packets distributed from the distributor;

an order correction unit for receiving the packets from the packet analyzing units, rearranging the packets in order according to the sequence numbers assigned to the packets, and outputting the packets in the rearranged order.

By distributing the input packets to the analyzing units for information processing, the overall relaying performance of the packet processing apparatus may be improved.

According to a further embodiment, the distributor implemented in the packet processing apparatus of the present invention distributes the packets to the packet analyzing units according to a value of a predetermined bit in each of the packets input to said distributor.

By referring to the value of the predetermined bit in each packet, the packets with the same bit values may be distributed to the same packet analyzing unit.

Further, the distributor may include a plurality of output buffers to which the packets are distributed, these output buffers corresponding to the packet analyzing units; and the distributor may set a threshold value to an amount of accumulated data in each of the output buffers, and stop distributing the packets to at least one of the output buffers when the amount of accumulated data in the at least one of the output buffers exceeds the threshold value.

By setting the threshold value to control the distribution of the packets, the respective loads of the packet analyzing modules may be averaged out.

According to another embodiment, the order correction unit implemented in the packet processing apparatus of the present invention includes:

a packet buffer for storing the packets supplied from the packet analyzing units;

an address manager having a plurality of entries corresponding to the sequence numbers that are assigned to the packets; and a buffer control unit for storing in the entries of the address manager, packet buffer addresses of the packets supplied from the packet analyzing units and stored in the packet buffer, which packet buffer addresses are stored in the entries according to the sequence numbers assigned to the packets, reading the packet buffer addresses from the entries of the address manager in order according to the sequence numbers, reading the packets from the packet buffer in order according to the sequence numbers, and outputting the read packets.

By implementing the packet buffer, the address manager, and the buffer control unit, the processed packets may be output in the order they were input even when the length of each of the packets distributed to the packet analyzing units is varied.

Preferably, the packet buffer addresses are read from the address manager by the buffer control unit after the packet addresses have been stored in all the entries of the address manager so that the packets distributed to the packet analyzing units may be output in the order they were input.

Further, the order correction unit may include a first dysfunction detector for detecting a dysfunction when a difference between the number of packets stored in the packet buffer and the number of packets read from the packet buffer exceeds a predetermined value.

Alternatively, the order correction unit may include a second dysfunction detector for detecting a dysfunction when the entry of the address manager in which the packet buffer address has just been stored is ahead of the entry from which the packet buffer address is to be read by more than a number of entries corresponding to a predetermined monitoring window value.

By implementing the dysfunction detector, a dysfunction may be detected and the packet processing apparatus may be restored to perform normal operations.

In another embodiment, the packet processing apparatus of the present invention may further include search means for integrally performing search processes requested by the packet analyzing units so that packets belonging to the same flow can be analyzed using the same search means.

DESCRIPTION OF THE PREFERRED EMBODIMENTS

In the following, preferred embodiments of the present invention are described with reference to the accompanying drawings.

Figure 1:
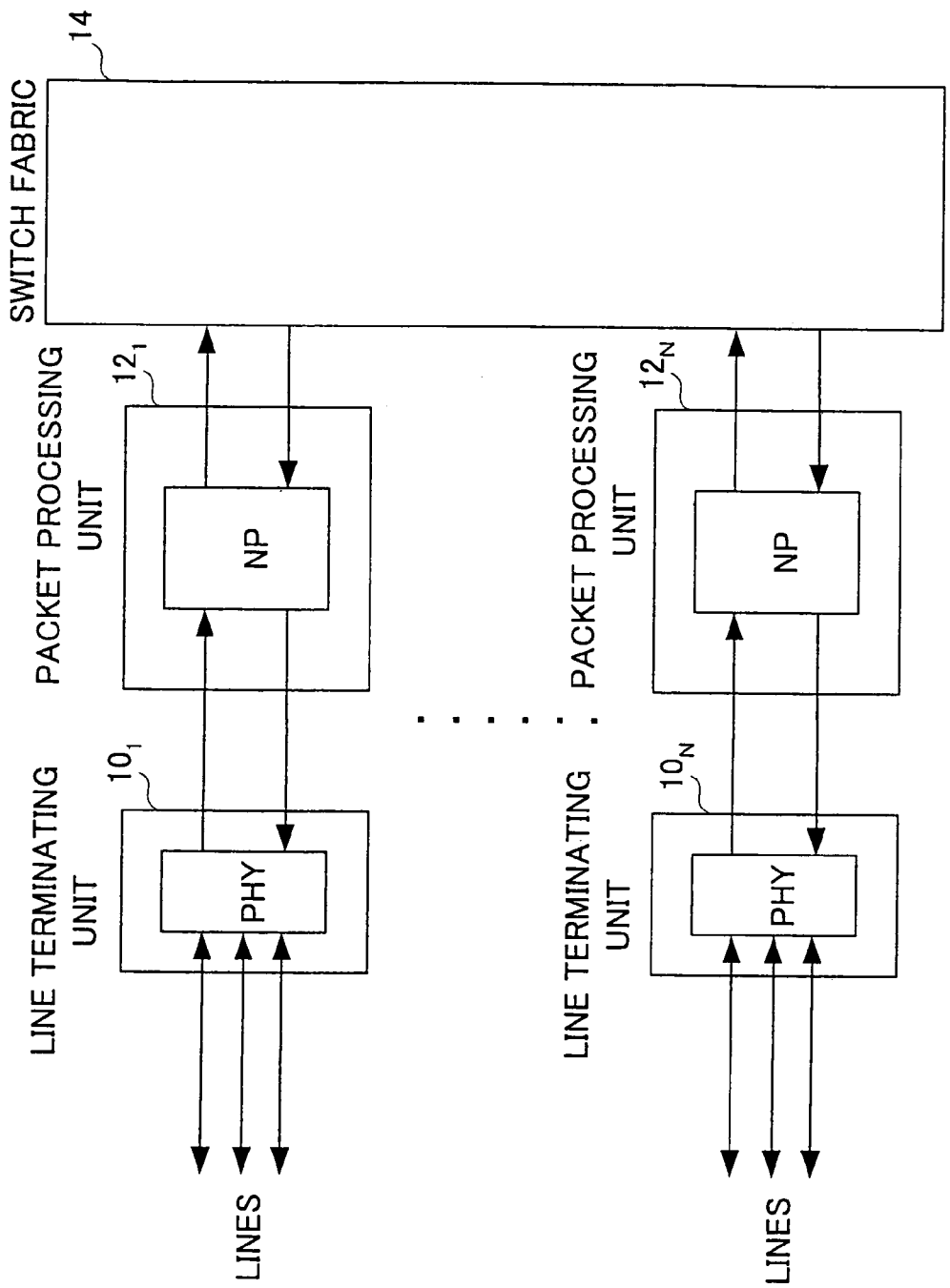
FIG. 1 is a block diagram showing a conventional configuration of an IP router apparatus.
Figure 2:
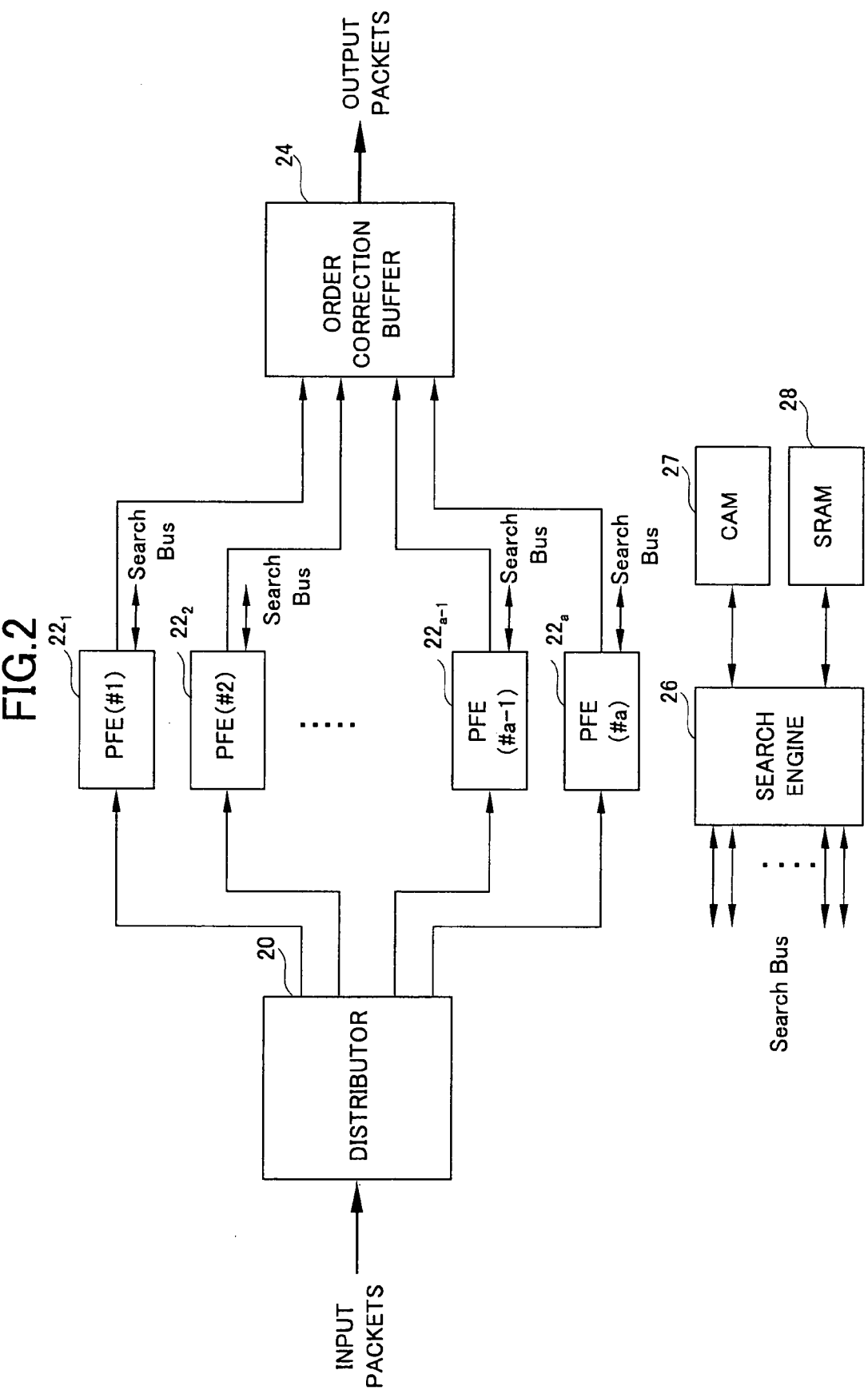
FIG. 2 is a block diagram showing a packet processing apparatus according to an embodiment of the present invention.

FIG. 2 is a block diagram showing an exemplary packet processing apparatus according to an embodiment of the present invention. This packet processing apparatus may be implemented as each of the packet processing units $12_1 \sim 12_N$ shown in FIG. 1, for example.

The packet processing apparatus of FIG. 2 includes a distributor 20, packet analyzing modules (PFE) $22_1 \sim 22_a$, and an order correction buffer 24. The distributor 20 distributes packets input thereto to the packet analyzing modules (PFE) $22_1 \sim 22_a$. In each of the packet analyzing modules (PEF) $22_1 \sim 22_a$, information such as the destination and sender of the packet is analyzed, after which the packet is stored in the order correction buffer 24. The packets accumulated in the order correction buffer 24 in this way are read according to the input order of the packets and output to the switch fabric 14, for example.

In this packet processing apparatus, given that the input physical band of the distributor 20 is denoted as BW, at least a number n=a of packet analyzing modules (PFE) $22_1 \sim 22_a$ having an input/output physical band that is equal to or greater than BW/a are implemented in a parallel arrangement. The output of the distributor 20 is interfaced with the input of the packet analyzing modules (PFE) $22_1 \sim 22_a$, and the output of each of the packet analyzing modules (PFE) $22_1 \sim 22_a$ is interfaced with the input of the order correction buffer 24.

Further, the physical band of the output of the order correction buffer 24 is set equal to or greater than BW. According to this arrangement, a packet processing apparatus having a physical band of BW can be realized by implementing a plurality of packet analyzing modules with smaller input/output bands.

Figure 3:
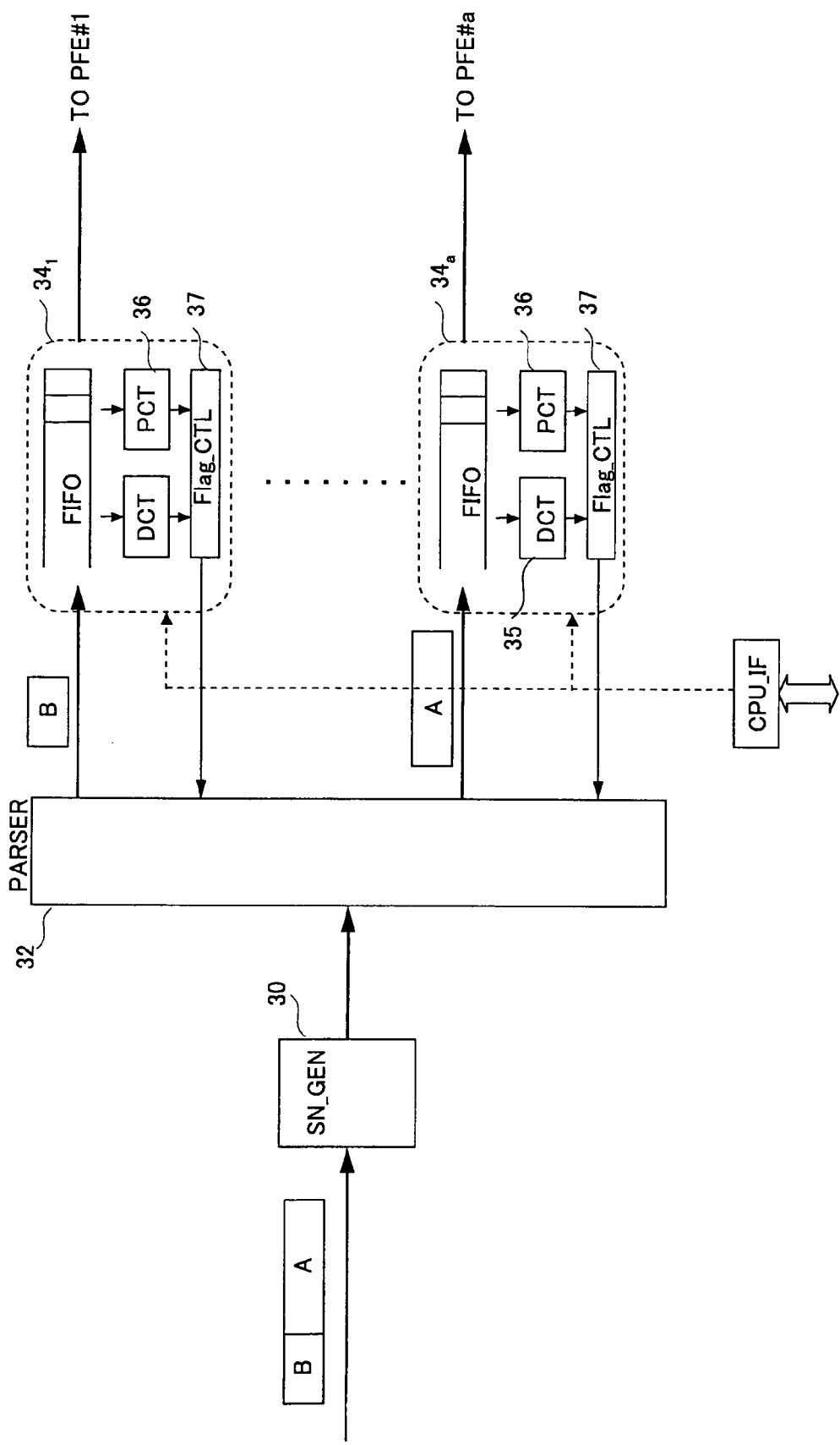
FIG. 3 is a block diagram showing a distributor according to an embodiment of the present invention.

FIG. 3 is a block diagram showing an exemplary configuration of the distributor 20. The distributor 20 is nominally made up of three blocks, namely, an SN assigning unit 30, a parser 32, and output FIFOs $34_1 \sim 34_a$. The distributor 20 allots an input packet to one of the packet analyzing modules (PFE) $22_1 \sim 22_a$ and transmits the packet to the corresponding output port.

The SN assigning unit (SN_GEN) 30 assigns a sequence number (SN) to an input packet in order to perform order correction control in the last stage of the packet processing. The sequence number is entered in a designated field of the input packet. The SN assigning unit (SN_GEN) 30 sequentially assigns values 0~N (N being an integer) to packets input thereto as their sequence numbers (the values 0~N being repeatedly used in cycles). The integer N may be determined by the following formula given that a number n=P of packet analyzing modules are used in a packet processing system that designates a minimum packet length as Lmin and a maximum packet length as Lmax.

Integer N≧Integer N int×(P−1)+1, provided that Integer N int>Lmax/Lmin

According to the above formula, in a worst case scenario in which a maximum length packet is allocated to one of the packet analyzing modules and minimum length packets are allocated to the rest of the packet analyzing modules, the integer N corresponds to a total number of packets that may reach the order correction buffer 24 from the time the maximum length packet starts to be output from the packet analyzing module to the time the output is completed.

The parser 32 allots the packets to the packet analyzing modules (PFE) $22_1 \sim 22_a$ according to various methods. In all of the various methods, a basic procedure is performed in which a designated area (e.g., the destination address, the sender address, or both) of a packet is referred to so that a predetermined bit in the area is extracted as a code value, and the packet is output to a packet analyzing module according to this code. In this way, packets with the same destination address or sender address may be distributed to the same packet analyzing module so that the order of the packets may be maintained among the packets with the same destination address or sender address.

It is noted that, instead of using a simple code as in the above example, the packets may be allotted based on a remainder obtained from dividing the predetermined bit value of the packet by a designated formula.

Based on this allotting procedure, the parser 32 writes the allotted packets to the respective output FIFOs $34_1 \sim 34_a$ from their corresponding output ports. Then, the outputs of the output FIFOs $34_1 \sim 34_a$ are read at the respective physical band speeds of their corresponding packet analyzing modules (PFE) $22_1 \sim 22_a$.

In the case where the packets are allotted in this manner, a bias may occur in the packet analyzing modules (PFE) $22_1 \sim 22_a$ depending on the data pattern of the input packets. When a bias is created, this bias may be compensated for by controlling the packets to be routed to packet analyzing modules with a low load so that the load of each packet analyzing module may be averaged out. Each of the output FIFOs $34_1 \sim 34_a$ is provided with two types of load meters for measuring its load, as is described below.

A data capacity monitoring meter (DCT) 35 implemented in each of the output FIFOs $34_1 \sim 34_a$ monitors the amount of data accumulated therein. A flag control unit 37 may set a threshold value to the amount of accumulated data measured by the data capacity monitoring meter (DCT) 35. The flag control unit 37 compares the amount of accumulated data measured at a given time with the threshold value, and if the measured amount exceeds the threshold value, a load flag is set to 1. It is noted that the threshold value may be individually set depending on the set/reset state of the load flag so that hysteresis control may be possible.

A packet number monitoring meter (PCT) 36 implemented in each of the output FIFOs $34_1 \sim 34_a$ monitors the number of packets stored therein. As with the data capacity monitoring meter (DCT) 35, the flag control unit 37 may set a threshold value to the number of packets counted by the packet number monitoring meter (PCT) 36. The flag control unit 37 compares the number of packets with the threshold value and sets the load flag to 1 if the number of packets exceeds the threshold value. This means that the load flag is set to 1 either when the value obtained from the data capacity monitoring meter (DCT) 35 exceeds its corresponding threshold value or when the value obtained from the packet number monitoring meter (PCT) 36 exceeds its corresponding threshold value. The state of the load flag is provided to the parser 32. It is noted that at least the data capacity monitoring meter 35 is implemented whereas the packet number monitoring meter may be omitted.

As is described above, the parser 32 determines the packet analyzing module to which a packet is to be output based on the allotting procedure. Herein, the parser 32 may also refer to the load flag state of the output FIFOs $34_1 \sim 34_a$. For example, if the determination result designates a packet to be output to an output FIFO corresponding to an $x^{th}$ packet analyzing module, and this output FIFO is in an overloaded state, the packet may be allotted to the next $(x+1)^{th}$ packet analyzing module. If this $(x+1)^{th}$ packet analyzing module is also in an overloaded state, the packet may be allotted to the next $(x+2)^{th}$ packet analyzing module.

The order correction buffer 24 receives packets from the packet analyzing modules $22_1 \sim 22_a$ and multiplexes the packets for outputting. Herein, the packets are output in the order in which they were input to the distributor 20. That is, order correction is performed based on the sequence numbers assigned to the packets in the distributor 20.

Since the packets are variable-length packets, it is impossible to determine which packet analyzing module will be outputting a packet of what length. However, if order correction is performed with respect to each cycle of the sequence numbers, the order of the packets may be restored.

Figure 4:
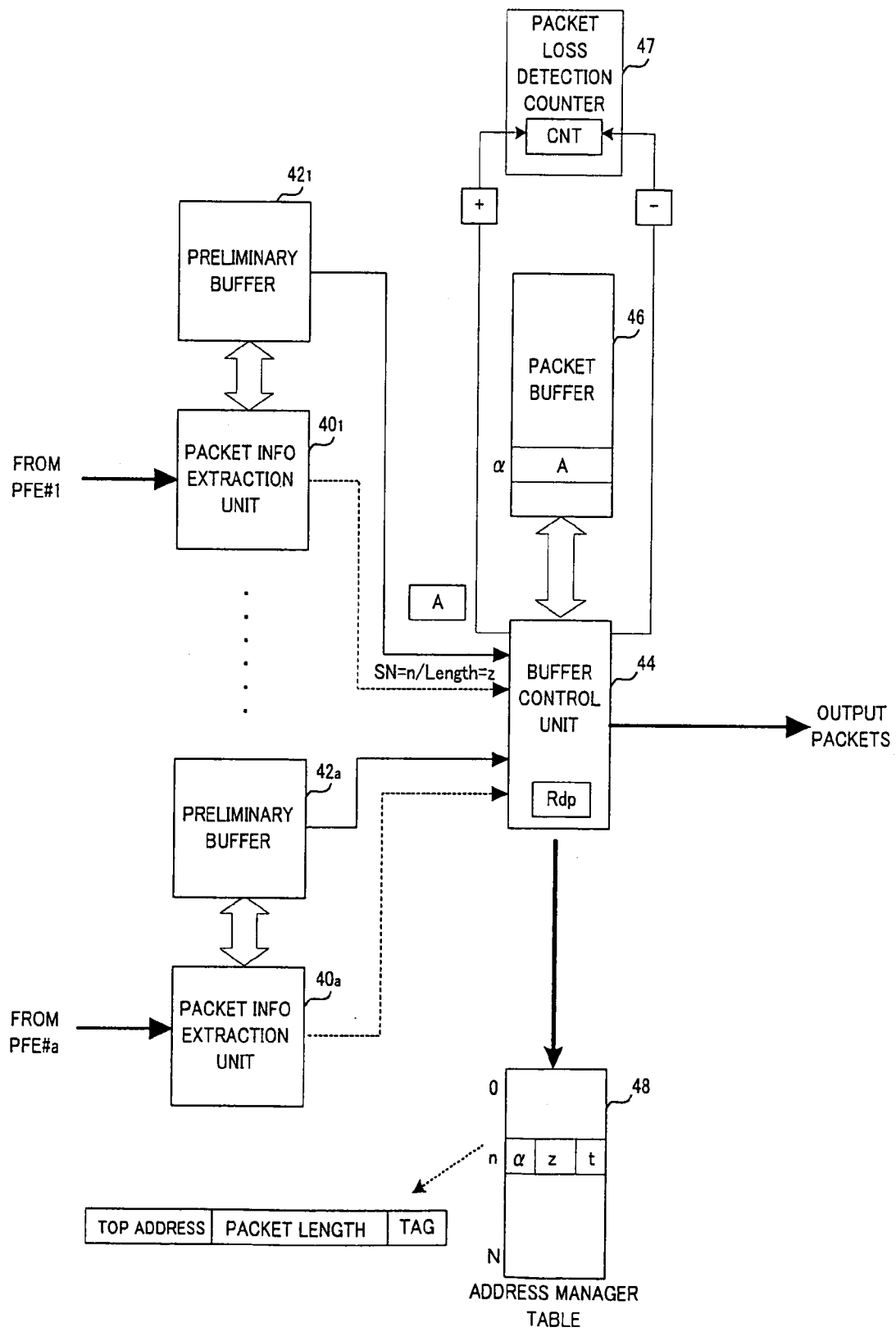
FIG. 4 is a block diagram showing an order correction buffer according to a first embodiment.

FIG. 4 is a block diagram illustrating an order correction buffer according to a first embodiment of the present invention. In this drawing, packets output from the packet analyzing modules $22_1 \sim 22_a$ are supplied to packet information extracting units $40_1 \sim 40_a$ after which they pass through preliminary buffers $42_1 \sim 42_a$ and a buffer control unit 44 to be stored in a packet buffer 46.

The packet information extracting units $40_1 \sim 40_a$ have functions of extracting the sequence number and the packet length of each packet supplied thereto from the packet analyzing modules $22_1 \sim 22_a$ and transferring this information via the buffer control unit 44 for storage in an address manager table 48.

The packet buffer 46 corresponds to a memory for storing the packet data in the order in which they are supplied. The address manager table 48 stores a top address and the packet length of each packet stored in the packet buffer 46 along with a tag bit. The address manager table 48 has 0~N address entries corresponding to the sequence numbers.

The packets from the packet analyzing modules $22_1 \sim 22_a$ are written in the packet buffer 46 in the order in which they arrive. The sequence number of a written packet is referred to in order to determine its corresponding address entry of the address manager table 48 in which entry the top address and the packet length of the packet written in the packet buffer 46 and the tag bit (value 1) indicating the validity of this entry are written and registered.

When the buffer control unit 44 recognizes that the tag bits corresponding to each of the addresses stored in the address manager table 48 have the value 1, and the packets corresponding to the sequence numbers 0~N are stored in the packet buffer 46, the buffer control unit 44, using a readout pointer (Rdp), successively performs processes of reading from the address manager table 48, the content of each entry, namely, the top address and the packet length, starting from address entry 0, and reading from the packet buffer 46 the packet data for the length indicated by the packet length starting at the address indicated by the top address. In this way, the buffer control unit 44 is able to read the packet data from the packet buffer 46 according to the order of the sequence number.

Then, after reading the packet from the packet buffer 46, the buffer control unit 44 sets the tag bit corresponding to the address of the packet read from the address manager table 48 to value 0 to indicate that the entry is cleared. Then, the readout pointer (Rdp) is incremented and the above processes are repeated. By performing these processes, the order of the packets read out from the packet buffer 46 corresponds to the order in which the packets are input to the distributor 20.

In this order correction process, when proper data transmission is performed in the packet processing apparatus, logical inconsistencies due to the absence of a sequence number, for example, will not be generated. However, when a sequence number is missing or redundant due to an intermittent dysfunction of the transmission path or a bit error in the packet processing apparatus, for example, such problems will be reflected in the order correction process.

Thus, an order correction recovery mechanism is implemented in the address manager table 48. Herein, the buffer control unit 44 increments a counter 47 by one each time a packet is stored in the packet buffer 46, and decrements the counter 47 by one each time a packet is read from the packet buffer 46.

In a normal case in which the input number and the output number of the packets correspond, the counter 47 is maintained at a fixed value; however, in a case where packet loss occurs, the output from the order correction buffer 24 stops and, therefore, the value of the counter increases. For example, a threshold value of N/2 may be set for the counter value to monitor the process and detect a dysfunction.

Upon restarting the process after the dysfunction detection, the SN generation initial value may be reset to 0, the readout pointer (Rdp) value of the buffer control unit 44 may be reset to 0, and the counter 47 value for detecting the dysfunction may be reset to 0 as well so that the process can be restarted.

Also, the above restarting process performed upon detecting packet loss may also be performed when an error is detected as a result of conducting error monitoring on the packet data at the input portion of the order correction buffer using parity or CRC, for example, or when a dysfunction is detected in the packet analyzing modules $22_1 \sim 22_a$.

Figure 5:
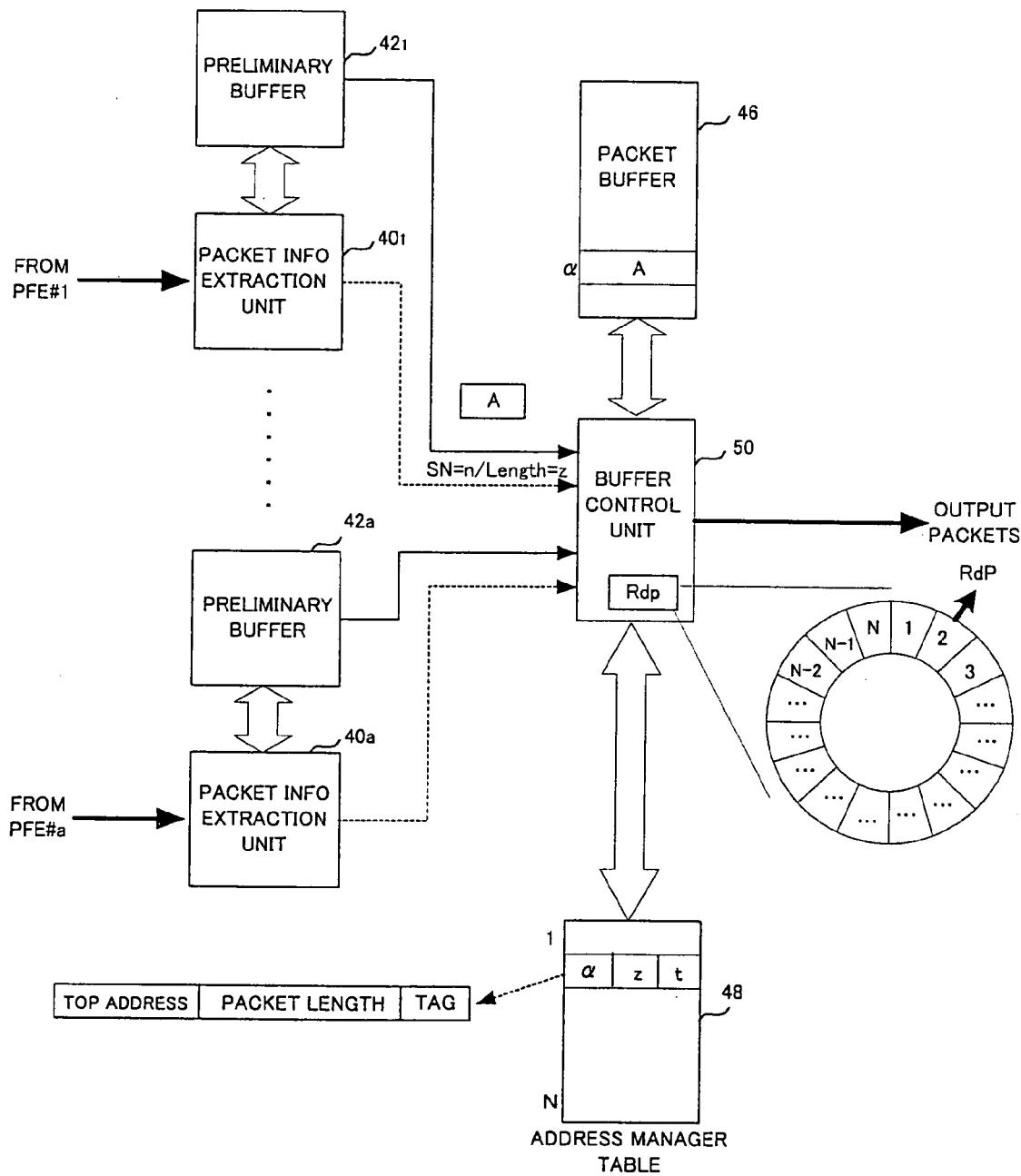
FIG. 5 is a block diagram showing another order correction buffer according to a second embodiment.

FIG. 5 is a block diagram illustrating an order correction buffer according to a second embodiment of the present invention. In this drawing, parts that are identical to those shown in FIG. 4 are given the same numerical references. In FIG. 5, packets from the packet analyzing modules $22_1 \sim 22_a$ are supplied to the packet information extracting units $40_1 \sim 40_a$ after which they go through the preliminary buffers $42_1 \sim 42_a$ and a buffer control unit 50 to be stored in the packet buffer 46.

The packet information extracting units $40_1 \sim 40_a$ extract the sequence number and the packet length of each packet supplied thereto from the packet analyzing modules $22_1 \sim 22_a$ and transfer this information through the buffer control unit 50 to the address manager table 48.

The packet buffer corresponds to a memory that stores the packet data in the order in which they are supplied. The address manager table 48 stores the top address, the packet length, and the tag bit for each of the packets stored in the packet buffer 46. The address manager table 48 has entries corresponding to each of the sequence numbers 0N.

The packets arriving from the packet analyzing modules $22_1 \sim 22_a$ are written in the packet buffer 46 in the order in which they arrive. Then, the sequence number of a written packet is referred to, and in the address entry of the address manager table 48 corresponding to this sequence number, the top address and the packet length of the packet written in the packet buffer 46 as well as the tag bit indicating the validity of this entry (value 1) are written and registered.

The buffer control unit 50, using the readout pointer (Rdp), successively performs the processes of reading the contents of the address entry of the address manager table 48, that is, the top address, the packet length, and the tag bit, starting with the address entry 0, and when recognizing the tag bit as being set to value 1 indicating the completion of the entry registration, reading from the packet buffer 46 the packet data for the length indicated by the packet length, starting at the address indicated by the top address.

When the readout is completed, the tag bit may be reset to value 0 to indicate that the corresponding entry of the address manager table 48 is cleared. Also, the buffer control unit 50 increments the readout pointer (Rdp), and repeats the above processes. In this way, the readout order of the packets from the packet buffer 46 corresponds to the input order of the packets to the distributor 20.

In the order correction process, when proper data transmission is performed in the packet processing apparatus, anomalies such as an absence of a sequence number will not occur and logical inconsistencies do not have to be dealt with. However, when a sequence number is missing or when a redundant sequence number is generated due to an intermittence dysfunction of the transmission path or a bit error in the packet processing apparatus, such problem will be reflected in the order correction process.

Thus, an order correction recovery mechanism is implemented in the address manager table 48. In this embodiment, a monitoring window value W is set to the address manager table 48, and when packet information is registered in an entry that is positioned further ahead of the readout pointer (Rdp) position+the window value (W) of the address manager table 48, the buffer control unit 50 detects this dysfunction as packet loss. Also, the address manager table 48 is arranged in a ring configuration in which the address entry N continues on to address entry 0.

Figure 6A:
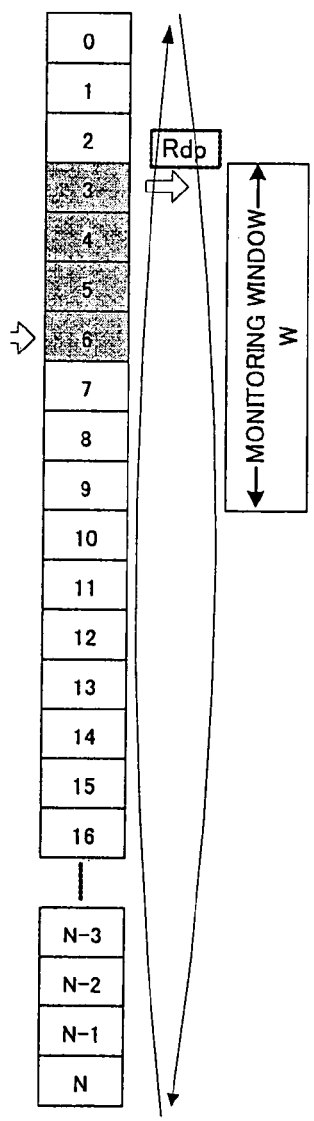
FIGS. 6A-6C are data diagrams illustrating an operation of the order correction buffer according to the second embodiment.

In a case where there is neither a missing sequence number nor a redundant sequence number, the entries are successively registered starting from the address entry 0 of the address manager table 48, and the registered entries are successively read out. Thus, as shown in FIG. 6A, there is no case of packet information being registered in an entry ahead of the readout pointer (Rdp) position+window value (W) of the address manager table 48.

Figure 6B:
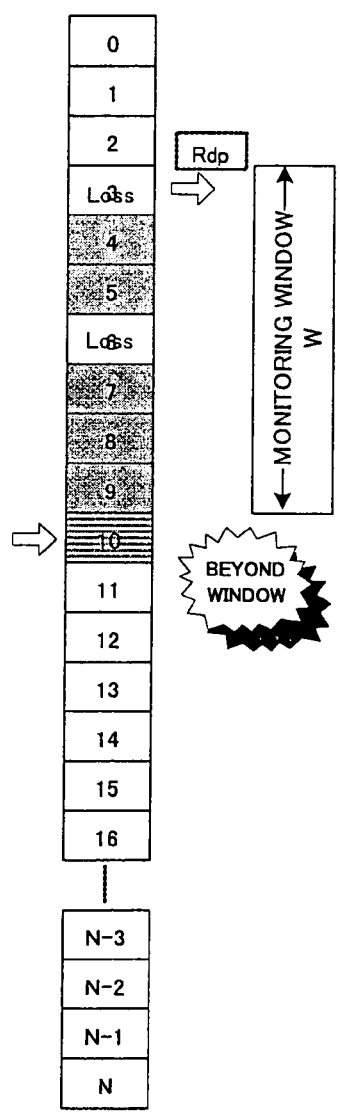

However, when there is a missing sequence number or a redundant sequence number and when packet loss occurs such that entries are not made for the address entries 3 and 6 of the address manager table 48, as shown in FIG. 6B, for example, the readout pointer (Rdp) of the address manager table 48 stops at the address entry 3. The packet information continues to be registered in the entries until packet information is registered in an entry beyond the readout pointer (Rdp) position+window value (W), at which point the dysfunction is detected.

Figure 6C:
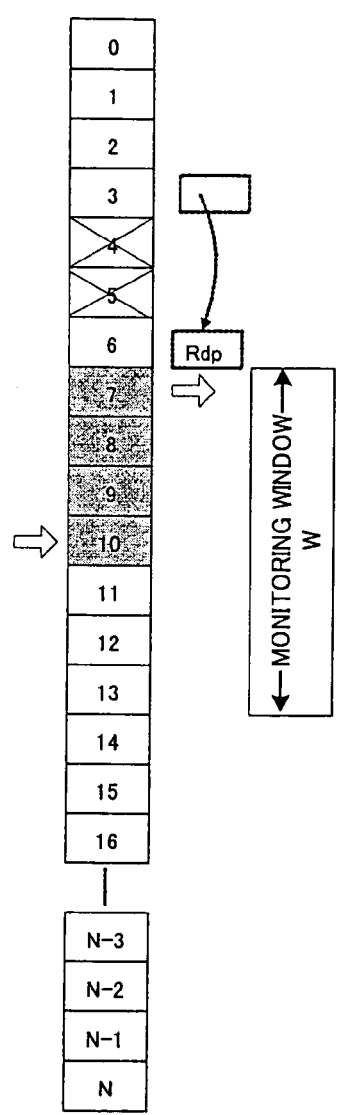

In this case, to restart the process after the detection of the dysfunction, the readout pointer is moved to the starting point of an unbroken succession of registered entries tracking back from the address entry (Rdp+W) of the address manager table 48 (i.e., address entry 7 in the example of FIG. 6C), and the readout process is resumed.

In the first embodiment of the present invention, N/2 packets are discarded due to the absence or redundancy of a sequence number, whereas, in the present embodiment, the dysfunction can be restored without unnecessarily discarding valid entries.

Referring back to FIG. 2, a search engine 26 is an integral search engine used for distributing the packets. The search engine 26 implements a CAM 27 and a RAM 28 that stores data pertaining to the information stored in the CAM 27. Also, routing entries and filing entries are set by superordinate software.

Since the packets are distributed according to their loads, packets belonging to the same flow, that is, packets with the same destination address and/or sender address may be allotted to different packet analyzing modules. Thereby, the packet analyzing modules $22_1 \sim 22_a$ are arranged to access the same search engine 26.

In this case, the plurality of packet analyzing modules $22_1 \sim 22_a$ may simultaneously attempt to access the search engine 26. Thus, the search engine 26 conducts mediation for controlling the accesses made to the search engine 26. This mediation control may be performed using a time slot allocation method or a round-robin control method. To realize the mediation function, request queues corresponding to each of the packet analyzing modules $22_1 \sim 22_a$ may be implemented in the search engine 26 for queuing the search requests from the packet analyzing modules $22_1 \sim 22_a$.

Further, the search engine 26 may have a counter that counts the number of hits made for each entry provided in the CAM 27. In this way, packets of the same flow that are distributed to different routes may be counted and statistical information may be integrally gathered.

Figure 7:
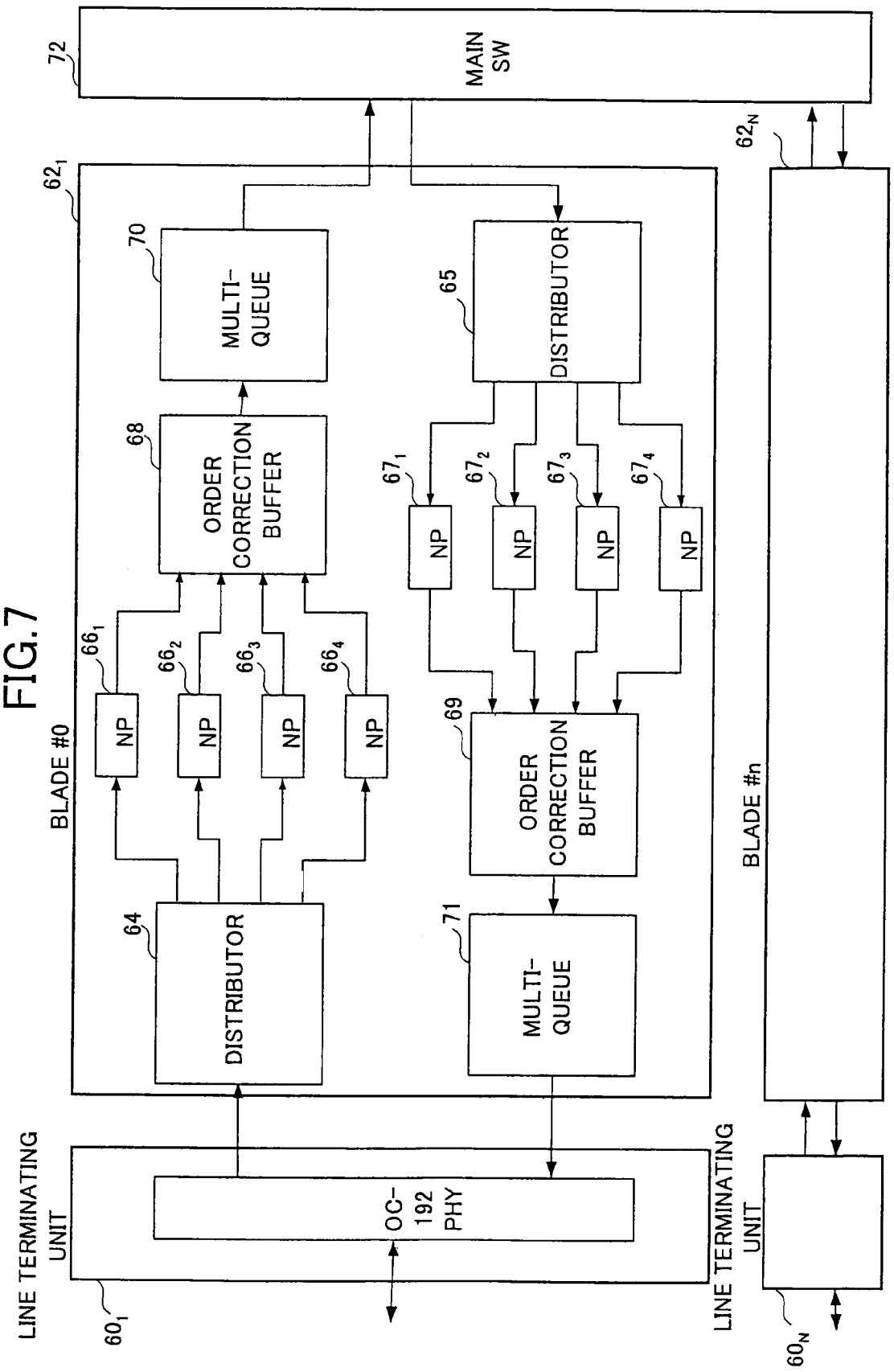
FIG. 7 is a block diagram showing an exemplary configuration of an IP router apparatus implementing the packet processing apparatus of the present invention.

FIG. 7 is a block diagram illustrating an exemplary IP router that implements a packet processing apparatus of the present invention. In this drawing, line terminating units $60_1 \sim 60_N$ may each end optical lines (OC-192) with a transmission speed of 10 Gbps, for example, and the packets received from the lines are supplied to packet processing units $62_1$~$62_N$ implemented as blades.

Each of the packet processing units $62_1$~$62_N$ include two packet processing apparatus systems. Similarly to the processing apparatus of FIG. 2, these packet processing apparatus systems respectively include distributors 64 and 65, packet analyzing modules (NP) $66_1$~$66_4$ and $67_1$~$67_4$ having processing speeds of 2.5 Gbps, for example, order correction buffers 68 and 69, multi-queues 70 and 71. Also, the packet analyzing modules (PFE) $66_1$~$66_4$ and $67_1$~$67_4$ are each connected to their respective search engines as in FIG. 2.

The packets received from the lines are distributed by the distributor 64 to the packet analyzing modules (NP) $66_1$~$66_4$, wherein information such as the destination and sender is analyzed after which the packets are stored in the order correction buffer 68. Then, the packets are read from the order correction buffer 68 in the order of input. Then, the packets are assigned priority classes and queued in the queues making up the multi-queue 70. Then, using a known scheduling algorithm, the packets are extracted from the respective queues starting with packets of high priority such as voice packets, and the packets are supplied to a switch fabric 72.

Then, the packets switched at the switch fabric 72 are supplied to the distributor 65 of the respective packet processing units $62_1$~$62_N$, and the packets are distributed to the packet analyzing modules $67_1$~$67_4$ wherein information such as the destination and sender is analyzed after which the packets are supplied to the order correction buffer 69. Then the packets are read from the order correction buffer 69 in the order they were input. Then the packets are assigned priority classes and queued in the queues making up the multi-queue 71. The packets are extracted from the respective queues according to a known scheduling algorithm starting with the packets with high priority. Then, the packets are transmitted to the destination line via the respective line terminating units $60_1$~$60_N$.

According to the present invention, a conventional packet analyzing module may be used to realize high speed data transmission in conjunction with an increase in data speed. That is, a new high speed packet analyzing module does not have to be developed to realize high speed data transmission in the packet processing apparatus. Also, the processing requirements of the packet analyzing module may be eased and thereby, various other processing functions may be implemented.

Further, even when packets of the same flow are processed in different packet analyzing modules through load distribution, routing can be realized by implementing a single CAM, and also, by using a single CAM, statistical information may be integrally gathered without complicated software control. Additionally, in a case where packet loss or other dysfunctions are generated, the process can be resumed without having to unnecessarily discard useful packets.

It is noted that the present invention is not limited to these embodiments, and variations and modifications may be made without departing from the scope of the present invention.

The present application is based on and claims the benefit of the earlier filing date of Japanese priority application No.2002-319917 filed on Nov. 1, 2002, the entire contents of which are hereby incorporated by reference.

What is claimed is:

1. A packet processing apparatus, comprising:
a distributor for assigning a sequence number to each of a plurality of packets input to said distributor and distributing the packets;
a plurality of packet analyzing units for realizing parallel execution of information analyzing processes on the packets distributed from the distributor; and
an order correction unit for receiving the packets from the packet analyzing units, rearranging the packets in order according to the sequence number assigned to each of the packets, and outputting the packets in the rearranged order, wherein
the distributor includes a plurality of output buffers corresponding to the packet analyzing units to which output buffers the packets are distributed,
the distributor sets a threshold value of an amount of accumulated data in each of the output buffers; and
when the amount of accumulated data in at least one output buffer of the output buffers exceeds the threshold value, the distributor refrains from distributing the packets to said at least one output buffer and redistributes the packets to the output buffers other than said at least one output buffer.

2. The packet processing apparatus as claimed in claim 1, wherein:
the distributor distributes the packets to the packet analyzing units according to a value of a predetermined bit in each of the packets input to said distributor.

3. The packet processing apparatus as claimed in claim 1, wherein the order correction unit includes:
a packet buffer for storing the packets supplied from the packet analyzing units;
an address manager having a plurality of entries corresponding to the sequence numbers assigned to the packets; and
a buffer control unit for storing, in the entries of the address manager, packet buffer addresses of the packets supplied from the packet analyzing units and stored in the packet buffer, which packet buffer addresses are stored in the entries according to the sequence number assigned to each of the packets; reading the packet buffer addresses from the entries of the address manager in order according to the sequence number assigned to each of the packets; reading the packets from the packet buffer in order according to the sequence numbers; and outputting the packets in the read order.

4. The packet processing apparatus as claimed in claim 3, wherein:
the packet buffer addresses are read from the address manager by the buffer control unit after the packet addresses have been stored in all the entries of the address manager.

5. The packet processing apparatus as claimed in claim 4, wherein:
the order correction unit includes a first dysfunction detector for detecting a dysfunction when a difference between the number of packets stored in the packet buffer and the number of packets read from the packet buffer exceeds a predetermined value.

6. The packet processing apparatus as claimed in claim 3, wherein:
the order correction unit includes a second dysfunction detector for detecting a dysfunction when the entry of the address manager in which the packet buffer address has just been stored is ahead of the entry from which the packet buffer address is to be read by more than a number of entries corresponding to a predetermined monitoring window value.

7. The packet processing apparatus as claimed in claim 6, wherein:

after the second dysfunction detector detects the dysfunction, the order correction unit resumes reading the packet buffer addresses from the address manager starting from the earliest entry of an unbroken succession of entries storing the packet buffer addresses, tracking back from the entry in which the packet buffer address has most recently been stored.

8. The packet processing apparatus as claimed in claim 1, further comprising:

search means for integrally performing search processes requested by the packet analyzing units.

9. The packet processing apparatus as claimed in claim 8, wherein:

the search means has a function of mediating accesses made by the packet analyzing units.

10. The packet processing apparatus as claimed in claim 8, wherein:

the search means is arranged to execute the search processes using an associative memory.

11. The packet processing apparatus as claimed in claim 10, wherein:

the search means is arranged to calculate a number of hits made for each of entries provided in the associative memory.

* * * * *